(12) United States Patent
Noe et al.

(10) Patent No.: US 6,554,563 B2
(45) Date of Patent: Apr. 29, 2003

(54) TANGENTIAL FLOW BAFFLE

(75) Inventors: Mark Eugene Noe, Morrow, OH (US); Toby George Darkins, Jr., Loveland, OH (US); Roger Lee Doughty, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 09/928,763

(22) Filed: Aug. 13, 2001

(65) Prior Publication Data

US 2003/0031555 A1 Feb. 13, 2003

(51) Int. Cl.[7] .............................................. F01D 9/06
(52) U.S. Cl. .................... 415/115; 416/96 A; 416/97 R
(58) Field of Search ................. 415/115, 116; 416/96 R, 96 A, 97 R

(56) References Cited

U.S. PATENT DOCUMENTS

| | | | |
|---|---|---|---|
| 3,369,363 A | * | 2/1968 | Campbell |
| 3,845,620 A | * | 11/1974 | Kenworthy ................ 60/39.65 |
| 3,995,422 A | * | 12/1976 | Stamm ....................... 60/39.66 |
| 4,267,698 A | * | 5/1981 | Hartmann et al. ............ 60/756 |
| 4,616,976 A | | 10/1986 | Lings et al. |
| 5,265,409 A | * | 11/1993 | Smith, Jr. et al. .......... 60/39.02 |
| 5,383,766 A | * | 1/1995 | Przirembel et al. ........ 416/97 A |
| 5,392,515 A | * | 2/1995 | Auxier et al. .......... 29/889.721 |
| 5,405,242 A | * | 4/1995 | Auxier et al. ................ 415/115 |
| 6,000,908 A | * | 12/1999 | Bunker ........................ 416/95 |
| 6,065,932 A | * | 5/2000 | Dodd ........................ 416/97 R |
| 6,237,344 B1 | * | 5/2001 | Lee ............................... 60/754 |

OTHER PUBLICATIONS

GE Aircraft Engines, "CF6–50 Engine HPT Nozzle Segment," in commercial use in the U.S. for more than one year, two pages.

* cited by examiner

Primary Examiner—Edward K. Look
Assistant Examiner—James M. McAleenan
(74) Attorney, Agent, or Firm—Nathan D. Herkamp; Francis L. Conte

(57) ABSTRACT

A turbine nozzle baffle includes a plurality of apertures inclined through a shell for discharging a coolant tangentially therefrom. The baffle is disposed inside a nozzle vane and the tangentially discharged coolant flows generally parallel along the inner surface of the vane for convection cooling thereof.

26 Claims, 4 Drawing Sheets

TANGENTIAL FLOW BAFFLE

The U.S. Government may have certain rights in this invention pursuant to contract number F33615-97-C-2778 awarded by the U.S. Department of the Air Force.

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases that flow downstream through high and low pressure turbines which extract energy therefrom. The high pressure turbine powers the compressor, and the low pressure turbine typically powers a fan disposed upstream from the compressor in a typical aircraft engine application.

Engine performance and efficiency are increased by increasing the temperature of the combustion gases from which energy is extracted in the turbines. This is particularly important for military turbofan engines in which maximum performance is desired at the expense of engine life and fuel economy.

The combustion gases are first discharged through a high pressure turbine nozzle which direct the gases through high pressure turbine blades for energy extraction therefrom, with the gases losing temperature as they flow downstream through the engine. The high pressure turbine nozzle therefore experiences the maximum gas temperature and is typically formed of high strength superalloy materials for withstanding the hot gas environment, and is cooled using air bled from the compressor.

However, state of the art superalloy metal materials have limited temperature capability for ensuring a suitable life thereof. And, the ability to cool the turbine nozzle is also limited by the cooling ability of the air bled from the compressor.

Accordingly, further advances in high performance aircraft engines require further improvements over conventional superalloy metal materials and cooling thereof. One promising advancement is the use of ceramic material in turbine nozzles for its inherent high temperature capability and thermal insulating capability. The ceramic material may either be monolithic or reinforced with ceramic fibers commonly referred to as Ceramic Matrix Composite (CMC). Such CMC ceramic materials are presently being developed and commercially available from various sources in the exemplary form of Silicon Carbide (SiC) in which a matrix of SiC is reinforced with SiC fibers.

However, ceramic materials are brittle and lack ductility and can withstand very little strain prior to failure.

Correspondingly, typical nickel based superalloys are ductile and can accommodate substantial strain. This is significant in the design of turbine nozzles subject to hot combustion gases and lower temperature cooling air which develop substantial thermal strain during operation.

Ceramic nozzle design therefore must be suitably tailored to minimize thermally induced strain due to the mechanical assembly of nozzle components as well as due to cooling thereof. For example, a typical metal turbine nozzle includes impingement baffles inside the individual nozzle vanes having a multitude of impingement holes which direct the cooling air perpendicularly against the inner surface of the vanes for impingement cooling thereof.

Impingement cooling is quite effective for removing heat, and correspondingly creates a substantial difference in temperature between the relatively cool inner surface of the vane wall and the relatively hot outer surface of the vane wall. The corresponding thermal strain from this differential temperature across the vane wall is accommodated by the ductility of typical nickel based superalloy metal material used in conventional turbine nozzles.

A ceramic turbine nozzle exasperates this problem since the ceramic is a thermal insulator. A ceramic nozzle vane wall would then experience an even greater temperature differential thereacross from impingement cooling on the inside thereof with the hot gases on the outside thereof. The increased differential temperature across a ceramic nozzle wall will create a corresponding increase in thermal strain, and due to the brittle nature of ceramic will substantially shorten the useful life thereof.

Accordingly, it is desired to provide an improved cooling arrangement for a ceramic turbine nozzle for limiting thermally induced strain therein due to differential temperature.

BRIEF SUMMARY OF THE INVENTION

A turbine nozzle baffle includes a plurality of apertures inclined through a shell for discharging a coolant tangentially therefrom. The baffle is disposed inside a nozzle vane and the tangentially discharged coolant flows generally parallel along the inner surface of the vane for convection cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
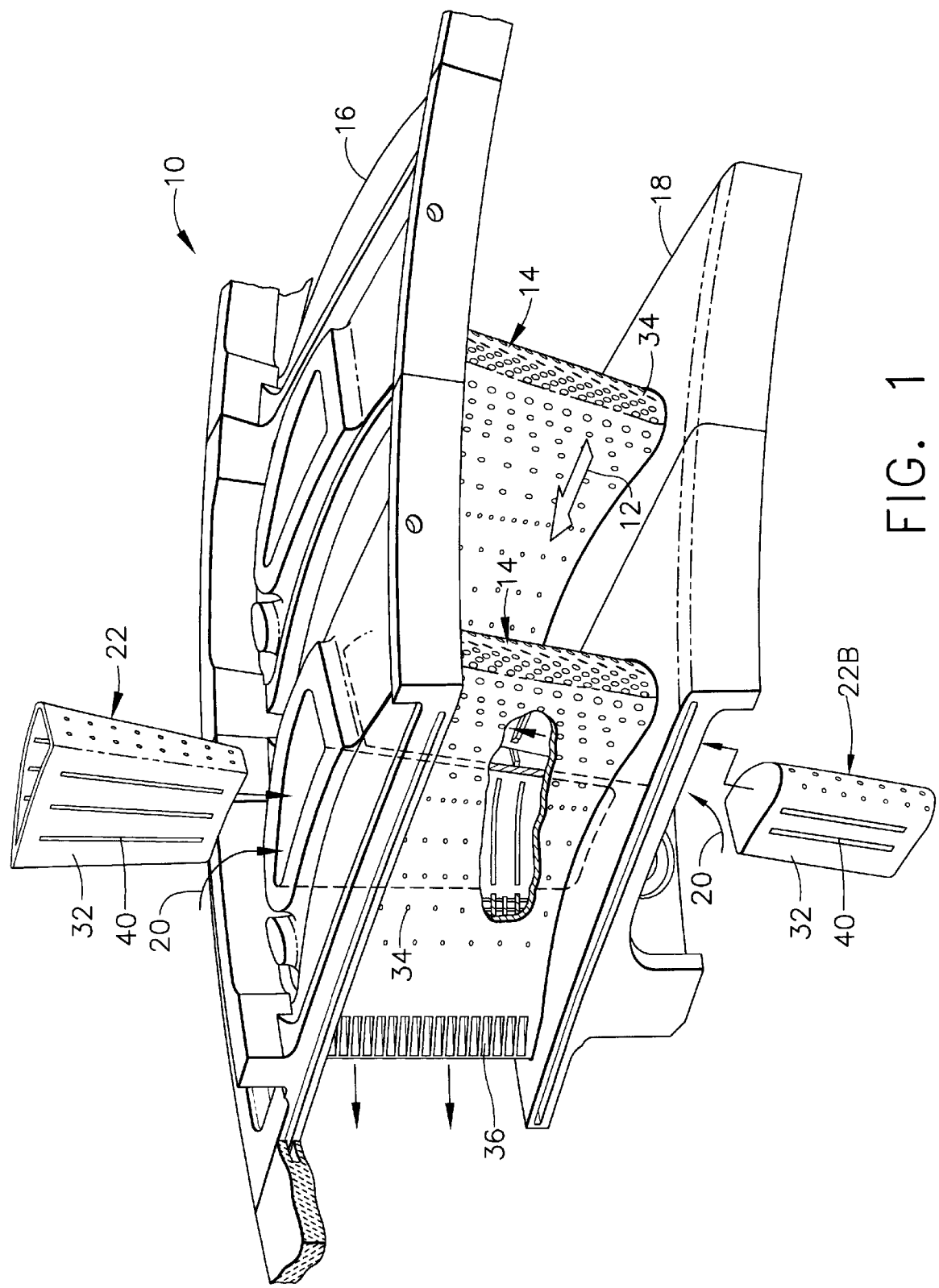
FIG. 1 is an isometric view of a portion of an annular high pressure turbine nozzle for a turbofan gas turbine engine in accordance with an exemplary embodiment of the present invention.

Illustrated in FIG. 1 is a portion of an annular high pressure turbine nozzle 10 for an aircraft turbofan gas turbine engine. The nozzle is disposed directly downstream from a combustor (not shown) which discharges hot combustion gases 12 thereto.

In the preferred embodiment, the nozzle is formed of arcuate circumferential segments with an individual nozzle vane 14 supported in corresponding segments of arcuate outer and inner bands 16,18. A plurality of the vanes and corresponding bands are arranged in a ring and suitably mounted in the engine for channeling the hot combustion gases downstream to a corresponding row of high pressure turbine rotor blades (not shown) for energy extraction thereby.

The vanes and bands are preferably ceramic for increasing the temperature capability of the combustion gases and increasing the performance of the engine in which the nozzle is used. As indicated above, any suitable ceramic material may be used such as monolithic or composite ceramic such as SiC—SiC CMC in which ceramic fibers are imbedded in a matrix of ceramic.

Individual ceramic vanes are preferably mounted in corresponding band segments for interrupting the circumferential continuity of the nozzle and reducing thermally induced differential expansion and contraction thereof during operation. The bands are suitably sealed to each other using conventional spline seals in the end faces thereof.

As initially shown in FIG. 1, each vane 14 is hollow for channeling therein a coolant 20 in the form of cooling air bled from the compressor (not shown) of the engine. In accordance with the present invention, each vane includes one or more coolant distribution baffles 22 suitably suspended therein which firstly receive the coolant prior to discharge along the inner surface of the vanes. The baffles 22 may be fabricated from either conventional metals or ceramic.

Figure 2:
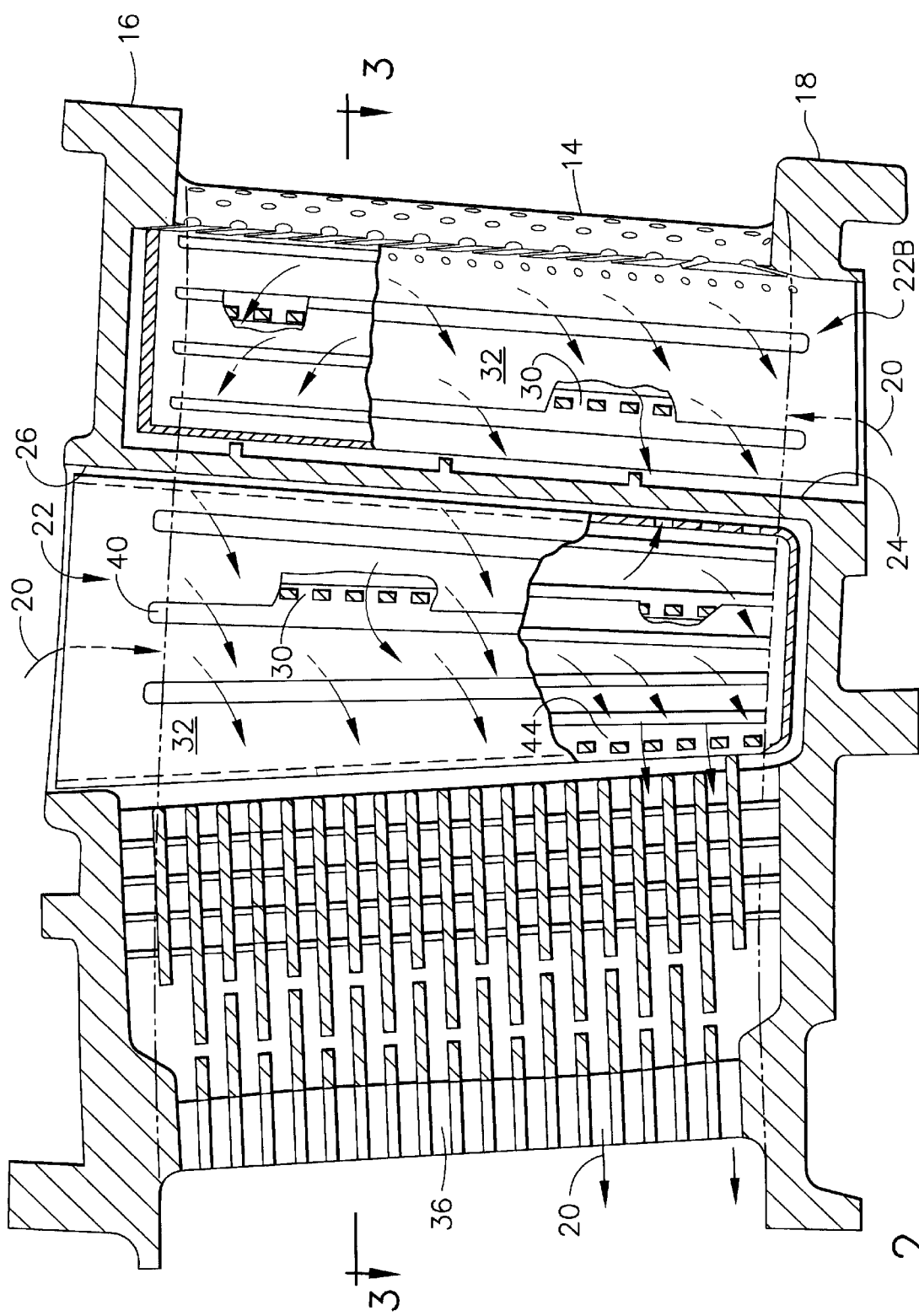
FIG. 2 is an axial sectional view through one of the nozzle vanes illustrated in FIG. 1 having a pair of baffles therein.
Figure 3:
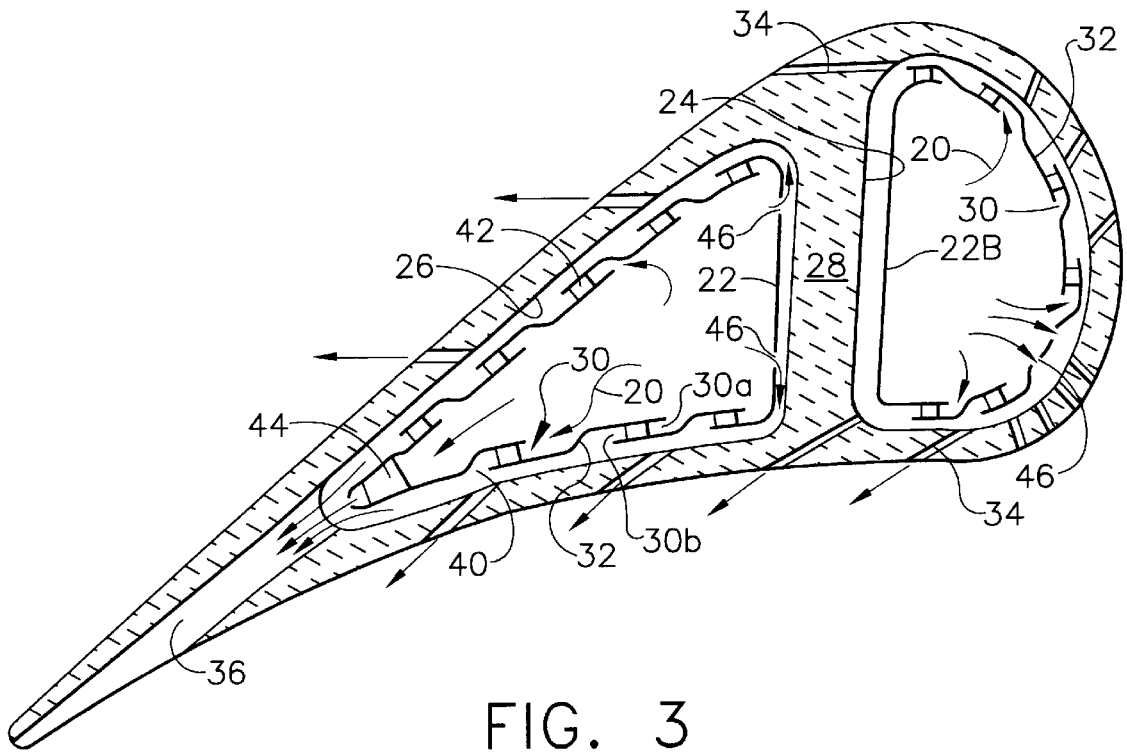
FIG. 3 is a radial sectional view through the nozzle vane illustrated in FIG. 2 and taken generally along line 3—3.

As shown in more detail in FIGS. 2 and 3, each vane preferably includes forward and aft cavities 24,26 separated by a rib or bridge 28 extending integrally between the opposite and suction sidewalls of the vane. Each of the cavities preferably includes a respective one of the baffles disposed therein and spaced from the inner surface of the vane. The two cavities are configured to conform with the aerodynamic crescent profile of the vane, and the two baffles are correspondingly configured for fitting therein with substantially uniform gaps between the baffles and the inner surface of the vane. The aft cavity 26 includes one baffle 22 specifically configured therefor, and the forward cavity 24 includes another one of the baffles, designated 22B, specifically configured for the forward cavity.

Figure 4:
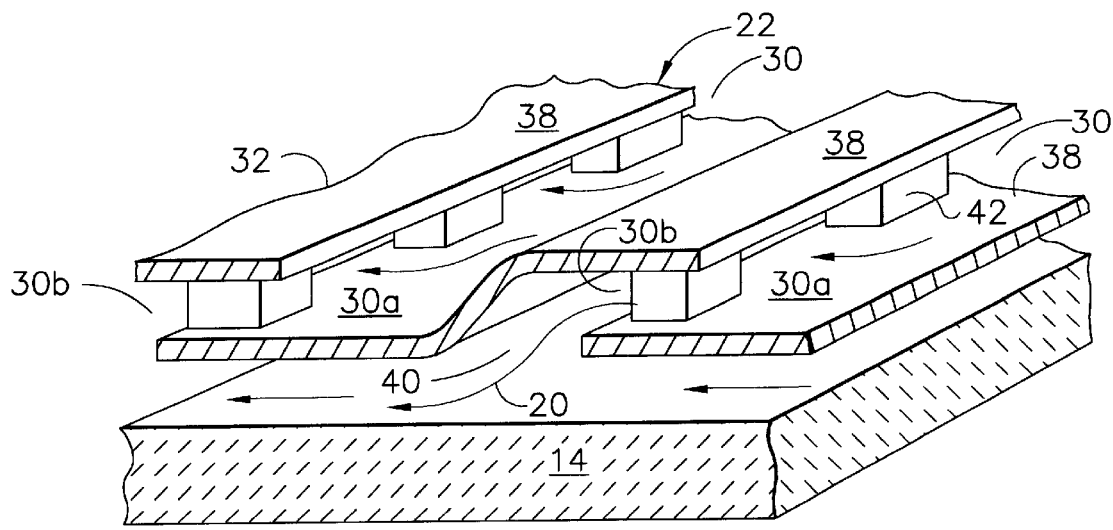
FIG. 4 is an isometric view of a portion of one of the baffles illustrated in FIG. 3 spaced from a portion of the nozzle vane.

FIGS. 3 and 4 illustrate in more particularity a preferred embodiment of the baffles 22,22B having a plurality of apertures 30 inclined through the wall or shell 32 for discharging the coolant 20 generally tangentially therefrom for flow generally parallel along the inner surface of the vane.

Each of the apertures 30 includes an inlet 30*a* disposed inboard or inside the shell for receiving the coolant, and an opposite outlet 30*b* disposed outboard or outside the shell and facing laterally along the shell for discharging the coolant laterally therealong. In contrast with a typical nozzle vane impingement baffle in which impingement holes extend through the baffle skin for discharging the coolant perpendicularly against the inner surface of the nozzle vane, the tangential flow baffles 22 configure the apertures 30 for distributing the coolant tangentially or laterally along the outer surface of the baffle for flow generally parallel with the inner surface of the nozzle vane.

The preferred configuration of the baffle apertures is to minimize or avoid direct impingement of the coolant against the vane inner surface, but instead direct that coolant generally parallel thereto for promoting uniform and diffuse convective cooling thereof. In this way, the inner surface of the vane may be preferentially cooled over the entire radial span of the vane without impingement cooling thereof for reducing the differential temperature across the vane sidewalls during operation.

Since the vane is preferably formed of a ceramic material, that material is a thermal insulator which requires preferential cooling to reduce the thermal gradient thereacross and correspondingly reduce thermally induced strain therein.

The forward and aft cavities 24,26 illustrated in FIGS. 2 and 3 may be sized and configured in any suitable manner within the envelope defined by the aerodynamic profile of the vane. The cavities extend the full span of the vane along the leading edge thereof and the mid-chord region thereof.

Correspondingly, the individual baffle shells 32 are generally tubular for fitting within the corresponding cavities and providing a substantially uniform gap between the baffles and the inner surface of the vane. The baffle apertures 30 are preferably arranged in radial rows extending along the span of the baffle shell and vane for distributing the coolant along the full span of the vane.

As shown in FIG. 2, the aft baffle 22 is open at the top for receiving the coolant therein and is closed at the bottom, and is configured for being suspended inside the aft cavity through the outer band 16. Correspondingly, the forward baffle 22B is open at its bottom for receiving the coolant and closed at its top, and is correspondingly suspended inside the forward cavity 24.

In this way, the coolant enters each baffle and flows inside the full radial span thereof prior to being distributed laterally therethrough for discharge through the corresponding apertures 30. The apertures are sized and configured and distributed over the span of the baffles for distributing the coolant as desired inside the corresponding cavities of the vane for preferential cooling thereof.

The coolant 20 is provided from the compressor with a sufficient pressure for driving the coolant through the baffle apertures. The coolant then flows along the inner surface of the vane for convection cooling thereof, and is then discharged from the vane in any conventional manner such as through various rows of film cooling holes 34 disposed through the sidewalls of the vane, and through trailing edge discharge holes 36.

As shown in FIGS. 3 and 4, the baffle shell is in the form of thin sheet metal or ceramic having a plurality of longitudinally straight slats or louvers 38 which overlap at the corresponding rows of apertures 30. The louvers extend over the majority of the span of the baffle corresponding with the span of the nozzle vanes and are spaced laterally apart to define common outlet slots 40. Each row of apertures terminates in flow communication with a respective louver slot for collectively discharging the coolant from the row of apertures.

In the radial cross section illustrated in FIGS. 3 and 4, the louvers are generally S-shaped for providing a substantially coextensive outer surface of the baffle spaced uniformly from the inner surface of the nozzle vane in each cavity. The inboard portion of the louvers are spaced from the outboard portion of the adjacent louvers by rows of standoffs or stanchions 42 which are longitudinally spaced apart along the span of the baffle for defining the individual apertures 30 therebetween. The stanchions may be integral portions of the louvers or separate pads suitably attached thereto by brazing metal or by melt infiltration bonding of ceramics, for example.

In this S-configuration of the louvers 38 illustrated in FIG. 4, the apertures are hidden inside the baffle behind the external skin thereof and discharge into the respective louver slots 40 facing outwardly. The apertures 30 are generally parallel to the external surface of the baffle with the inlets 30*a* and outlets 30*b* extending perpendicularly between the adjacent louvers. In this way, the coolant 20 is discharged from the apertures substantially parallel to the inner surface of the baffle and turns slightly to exit through the common slots 40 generally tangential to the outer skin of the baffle for flow generally parallel to the inner surface of the vane 14 to reduce or eliminate direct impingement thereagainst such as that found in conventional impingement baffles.

As shown in FIGS. 2 and 3 the rows of apertures and louver slots 40 are suitably distributed on opposite sides of the baffle for correspondingly cooling the inner surfaces of the opposite pressure and suction sides of the vane. The baffle is sized to maintain a substantially uniform gap between its external skin and the inner surface of the vane cavities for distributing the coolant therebetween. The coolant is supplied under pressure through the center of the baffle and is distributed over the entire radial span thereof for supplying relatively cool air over the entire span of the vane.

The coolant exits the louver slots and flows between the baffle and vane sidewalls to produce a controllable, uniform, diffuse convective film to cool the vane sidewalls while limiting the differential temperature thereacross. The tangential flow baffle described above is effective for cooling the inner surface of the vane and creating a differential temperature drop thereacross substantially less than that which would be provided by the use of a conventional impingement baffle directing the coolant substantially perpendicular to the inner surface of the vane. Reducing the temperature gradient through the vane sidewalls reduces the thermal strain and enhances the useful life of the ceramic during operation.

Since the coolant is discharged from the baffle illustrated in FIG. 3 laterally along its external skin, it may be channeled in opposite directions based on the orientation of the apertures. In the preferred embodiment illustrated the louvers and apertures are disposed on opposite sides of the shell between forward and aft ends thereof corresponding with the leading edge of the vane on the right of FIG. 3 and the trailing edge of the vane on the left of FIG. 3, respectively.

And, the aperture outlets 30b on both sides of the baffle shell preferably face toward the shell aft end. In this way, the coolant flows inside the vane in the forward-to-aft direction corresponding with the flow of the combustion gases outside the vane and then is discharged through the film cooling holes 34 and the trailing edge holes 36 for further cooling the vane during operation.

Alternatively, the apertures could face forward for directing the coolant locally forward inside the vane.

Since the airfoil illustrated in FIG. 3 converges between the leading and trailing edges, the aft baffle 22 correspondingly converges from the bridge 28 to the trailing edge holes 36. And the shell aft end preferably includes a single row of discharge holes 44 defined between radially spaced apart stanchions, with the discharge holes extending perpendicularly through the aft end of the baffle for discharging a portion of the coolant axially into the corresponding trailing edge holes 36.

Correspondingly, the forward end of the aft baffle is relatively wide to correspond with the lateral extent of the bridge 28 and includes one or more rows of discharge holes 46 extending perpendicularly therethrough for impingement cooling the fillet regions joining the bridge 28 to the opposite sidewalls of the vane. Since the bridge is an internal feature of the vane, it has different cooling requirements than the sidewalls of the vane directly exposed to the hot combustion gases. The discharge holes 46 may be suitably tailored differently than the side apertures 30 for corresponding with the desired cooling requirements. However, the inclined apertures 30 may be substituted for the discharge holes 46 if desired.

The forward baffle 22B illustrated in FIG. 3 has a generally annular configuration to match that of the forward cavity 24 directly behind the leading edge of the vane. Like the aft baffle, the forward baffle includes rows of the inclined apertures 30 formed by louvers on opposite sides of the vane which discharge the coolant in the aft direction from the common leading edge region of the vane. In this embodiment, the forward discharge holes 46 are located directly behind the leading edge of the vane for impingement cooling thereof due to the higher heat influx from the external combustion gases diverted around the vane during operation.

Accordingly, the individual baffles may be configured for the particular shape and position of the specific vane cavity for correspondingly tailoring the internal cooling of the vane inner surface while limiting the temperature gradients through the vane sidewalls during operation. Each baffle may include only the inclined apertures therethrough, or may optionally include conventional impingement holes 46 selectively located as desired.

Figure 5:
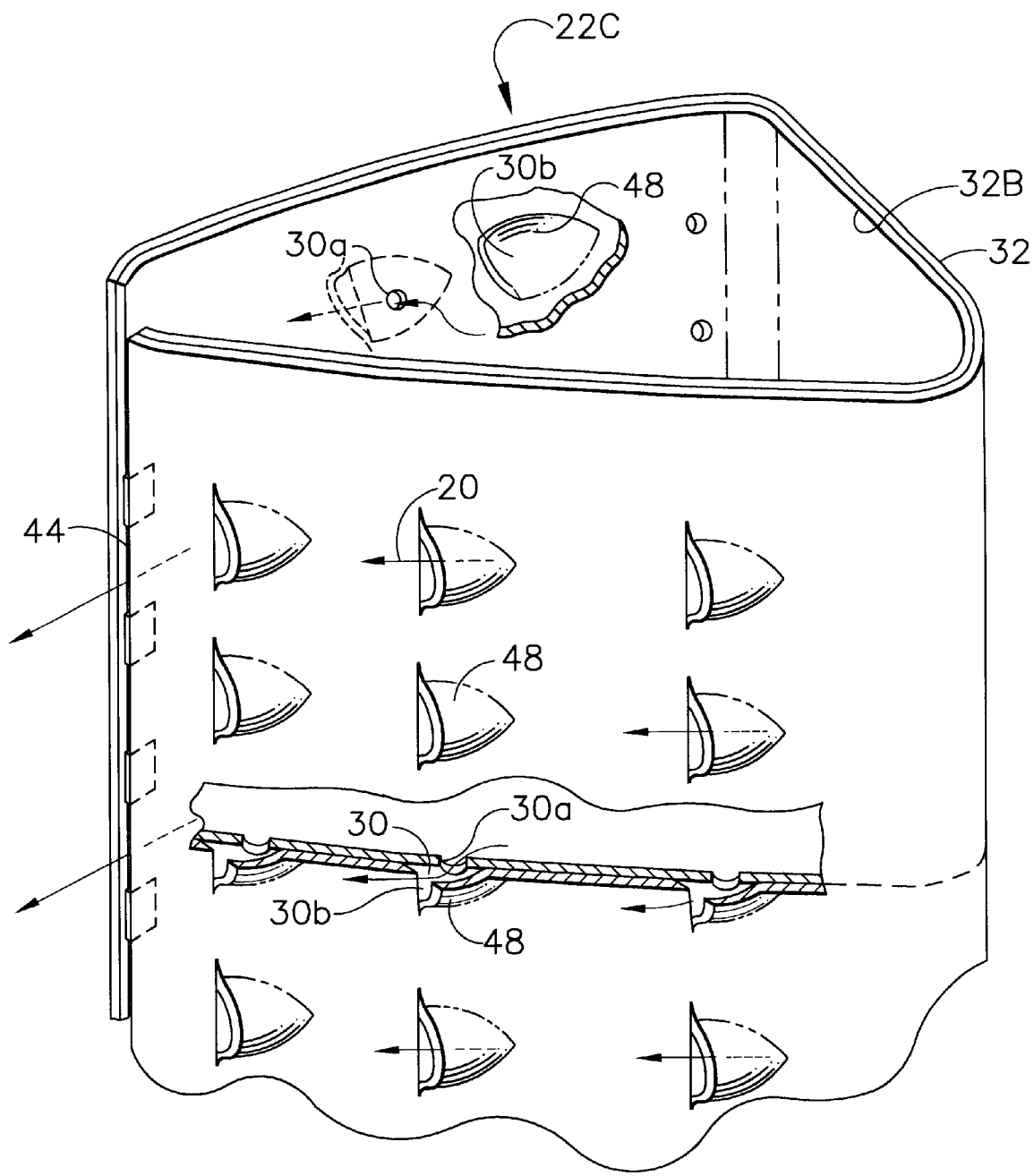
FIG. 5 is a partly sectional isometric view of a portion of another baffle for use in the turbine nozzle illustrated in FIG. 2 in accordance with another embodiment of the present invention.

FIG. 5 illustrates an alternate embodiment of the baffle designated 22C configured for use in the aft cavity 26 illustrated in FIG. 3 for example. In this embodiment, louvers in the form of dimples 48 are formed in the external surface of the shell 32 corresponding with each of the inclined apertures 30 in the general form of the common cheese grater. The aperture outlets 30b extend perpendicularly outwardly from the shell at a wide end of the dimples for discharging the coolant 20 tangentially from the external surface of the baffle generally parallel to the inner surface of the vane when used in the aft cavity illustrated in FIG. 3.

Each of the dimples converges from its wide end at the downstream end thereof to an opposite narrow end at its upstream end where it adjoins a respective one of the aperture inlets 30a. In this way, the individual dimples diverge in their downstream direction for diffusing and discharging the coolant as it flows through the dimples for discharge from the corresponding outlets 30b.

In the preferred embodiment illustrated in FIG. 5, the baffle shell is a laminated, double wall configuration with the outer shell or wall 32 covering an inner shell or wall 32B. The two shells may be mechanically joined together by interference, brazing, or tack welding for metal, or by melt infiltration bonding for ceramic, for example.

In this construction, the dimples 48 may be formed in the outer wall, and the aperture inlets 30a may be formed in the inner wall.

The inlets 30a are preferably sized smaller than the outlets 30b for metering the coolant through the apertures. In this way, the metered inlets may be used to control the distribution of the coolant over the span of the baffle and around its circumference. Alternatively, the outlets 30b may be metered.

Like the embodiment illustrated in FIG. 3, the dimples 48 and apertures 30 illustrated in FIG. 5 are similarly disposed on opposite sides of the baffle between the forward and aft ends thereof. And the aperture outlets 30b on both sides of the baffle preferably face toward the baffle aft end. In this way, the coolant 20 is discharged from the baffle laterally inside the vane and generally parallel to the internal surface thereof for flow in the aft direction toward the vane leading edge and discharge through the film cooling holes and the trailing edge holes as in the embodiment illustrated in FIG. 3.

The two louvered and dimpled forms of the tangential flow baffles disclosed above may be specifically tailored for the intended environment for providing convective cooling inside the nozzle vanes. In contrast with conventional impingement baffles, the tangential flow baffles have a reduced cooling effectiveness for decreasing the temperature gradient through the vane sidewalls, and is particularly useful for ceramic vanes having little ductility and accommodation for thermal strain. However, the tangential flow baffles may be used in other applications where desired.

The louver and dimple forms of the inclined apertures are examples of suitable forms thereof. Various other forms of inclined apertures may also be used provided they avoid direct perpendicular impingement of the coolant against the inner surface of the vane. Tangential flow baffles discharging coolant tangentially from their external surfaces for flow generally parallel to the inside of the vane cavities enjoy controllable, uniform, and diffuse convective film cooling effective for cooling the vane sidewalls with limited thermal gradients therethrough.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

What is claimed is:

1. A turbine nozzle baffle for cooling an inner surface of a hollow nozzle vane, said baffle comprising a shell including a plurality of apertures inclined through said shell for discharging a coolant tangentially from said shell for flow generally parallel along said vane inner surface.

2. A baffle according to claim 1 wherein each of said apertures includes an inlet disposed inboard said shell for receiving said coolant, and an outlet disposed outboard said shell facing laterally along said shell for discharging said coolant laterally therealong.

3. A baffle according to claim 2 wherein said shell is tubular, and said apertures are arranged in rows extending along the span of said shell.

4. A baffle according to claim 3 wherein said shell further comprises a plurality of louvers overlapping at said rows of apertures.

5. A baffle according to claim 4 wherein said louvers adjoin at outlet slots, and a row of said apertures is disposed in flow communication with a respective louver slot for collectively discharging said coolant therefrom.

6. A baffle according to claim 5 wherein said apertures are separated by respective stanchions disposed between adjacent louvers.

7. A baffle according to claim 6 wherein said aperture inlets and outlets extend perpendicularly between said adjacent louvers.

8. A baffle according to claim 6 wherein said louvers and apertures are disposed on opposite sides of said shell between forward and aft ends thereof, and said aperture outlets on both sides of said shell face toward said shell aft end.

9. A baffle according to claim 8 wherein:
said shell aft end includes a row of discharge holes extending perpendicularly therethrough; and
said shell forward end includes a plurality of rows of discharge holes extending perpendicularly therethrough.

10. A baffle according to claim 3 wherein said shell further comprises a plurality of dimples corresponding with said apertures, with said aperture outlets extending perpendicularly outwardly from said shell at a wide end of said dimples.

11. A baffle according to claim 10 wherein each of said dimples converges from said wide end to an opposite narrow end adjoining a respective one of said aperture inlets.

12. A baffle according to claim 11 wherein said shell further comprises inner and outer walls, with said dimples being disposed in said outer wall, and said aperture inlets being disposed in said inner wall.

13. A baffle according to claim 12 wherein said inlets are sized smaller than said outlets for metering said coolant through said apertures.

14. A baffle according to claim 12 wherein said dimples and apertures are disposed on opposite sides of said shell between forward and aft ends thereof, and said aperture outlets on both sides of said shell face toward said shell aft end.

15. A turbine nozzle comprising a hollow vane including a baffle disposed therein, and said baffle comprises a shell including a plurality of apertures inclined through said shell for discharging a coolant tangentially from said shell for flow generally parallel along an inner surface of said vane for cooling thereof.

16. A nozzle according to claim 15 wherein said shell is tubular, and said apertures are arranged in rows extending along the span of said shell inside said vane.

17. A nozzle according to claim 16 wherein said vane includes forward and aft cavities separated by a bridge extending integrally between opposite sidewalls of said vane, and each of said cavities includes a respective one of said baffles disposed therein and spaced from said vane inner surface.

18. A nozzle according to claim 17 wherein:
said shell further includes a plurality of louvers overlapping at said rows of apertures;
said louvers adjoin at said outlet slots; and
a row of said apertures is disposed in flow communication with a respective louver slot for collectively discharging said coolant therefrom.

19. A nozzle according to claim 18 wherein said apertures are separated by respective stanchions disposed between adjacent louvers, and said aperture inlets and outlets extend perpendicularly between said adjacent louvers.

20. A nozzle according to claim 19 wherein said louvers and apertures are disposed on opposite sides of said shell between forward and aft ends thereof, and said aperture outlets on both sides of said shell face toward said shell aft end.

21. A nozzle according to claim 20 wherein said vane is ceramic.

22. A nozzle according to claim 17 wherein said shell further comprises a plurality of dimples corresponding with said apertures, with said aperture outlets extending perpendicularly outwardly from said shell at a wide end of said dimples.

23. A nozzle according to claim 22 wherein each of said dimples converges from said wide end to an opposite narrow end adjoining a respective one of said aperture inlets.

24. A nozzle according to claim 23 wherein said shell further comprises inner and outer walls, with said dimples being disposed in said outer wall, and said aperture inlets being disposed in said inner wall.

25. A nozzle according to claim 24 wherein said inlets are sized smaller than said outlets for metering said coolant through said apertures.

26. A nozzle according to claim 24 wherein said dimples and apertures are disposed on opposite sides of said shell between forward and aft ends thereof, and said aperture outlets on both sides of said shell face toward said shell aft end.

* * * * *